(12) United States Patent
Wheeler

(10) Patent No.: US 12,493,671 B1
(45) Date of Patent: Dec. 9, 2025

(54) SYSTEMS AND METHODS FOR A SUBSCRIBABLE INFORMATION LOCKER

(71) Applicant: Wells Fargo Bank, N.A., San Francisco, CA (US)

(72) Inventor: Matthew Wheeler, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 177 days.

(21) Appl. No.: 18/174,816

(22) Filed: Feb. 27, 2023

(51) Int. Cl.
G06F 21/00 (2013.01)
G06F 21/31 (2013.01)
H04W 8/20 (2009.01)

(52) U.S. Cl.
CPC .............. G06F 21/31 (2013.01); H04W 8/20 (2013.01)

(58) Field of Classification Search
CPC ...... G06F 21/31; G06F 21/62; G06F 21/6227; G06F 21/6245; H04L 63/105; H04W 8/20; G06Q 20/40; G06Q 40/0305; G06Q 40/032
See application file for complete search history.

(56) References Cited

U.S. PATENT DOCUMENTS

| | | | |
|---|---|---|---|
| 6,947,897 B2 | 9/2005 | Lortscher et al. | |
| 8,682,753 B2 | 3/2014 | Kulathungam | |
| 10,664,910 B1* | 5/2020 | Koshet | H04L 63/102 |
| 11,232,518 B1* | 1/2022 | Mcwain | G06Q 40/03 |
| 2020/0076813 A1* | 3/2020 | Felice-Steele | H04L 63/18 |
| 2020/0234288 A1* | 7/2020 | Diana | G06Q 40/03 |
| 2020/0293684 A1* | 9/2020 | Harris | H04L 63/08 |
| 2023/0018820 A1* | 1/2023 | Rudrabhatla | G06F 12/1491 |
| 2023/0092596 A1* | 3/2023 | Kartoun | H04L 63/10 726/3 |
| 2023/0171568 A1* | 6/2023 | Messia | H04W 4/20 370/310 |

FOREIGN PATENT DOCUMENTS

KR 20010084364 A 9/2001

* cited by examiner

Primary Examiner — Joseph P Hirl
Assistant Examiner — Chi D Nguy
(74) Attorney, Agent, or Firm — Kilpatrick Townsend & Stockton LLP

(57) ABSTRACT

Systems and methods for a subscribable information locker are disclosed. One disclosed method includes receiving first secure user information associated with a user, updating a secure record associated with the user to include the first secure user information, determining a security level associated with the first secure user information, determining an authorization level associated with a subscriber, and upon determining that the authorization level meets the security level, transmitting data associated with the first secure user information to the subscriber.

16 Claims, 3 Drawing Sheets

SYSTEMS AND METHODS FOR A SUBSCRIBABLE INFORMATION LOCKER

FIELD OF TECHNOLOGY

The present disclosure generally relates to a locker for storing sensitive information and providing periodic subscriber updates when the sensitive information is updated.

BACKGROUND

Data about a given entity (e.g., an individual or organization) is stored by many parties for various purposes. For instance, an individual's home address is a commonly held piece of information about the individual. However, when that data changes, there is often no easy way to disseminate updates regarding the data to every third party that may now have stale data. Accordingly, there is a need for a subscribable information locker.

SUMMARY

According to certain embodiments, a method for a subscribable information locker comprises: receiving first secure user information associated with a user; updating a secure record associated with the user to include the first secure user information; determining a security level associated with the first secure user information; determining an authorization level associated with a subscriber; and upon determining that the authorization level meets the security level, transmitting data associated with the first secure user information to the subscriber.

According to another embodiment, a system for a subscribable information locker comprises: a processor configured to: receive first secure user information associated with a user; update a secure record associated with the user to include the first secure user information; determine a security level associated with the first secure user information; determine an authorization level associated with a subscriber; and upon determining that the authorization level meets the security level, transmit data associated with the first secure user information to the subscriber.

According to another embodiment, a non-transitory computer readable medium may comprise program code, which when executed by one or more processors, causes the one or more processors to: receive first secure user information associated with a user; update a secure record associated with the user to include the first secure user information; determine a security level associated with the first secure user information; determine an authorization level associated with a subscriber; and upon determining that the authorization level meets the security level, transmit data associated with the first secure user information to the subscriber.

BRIEF DESCRIPTION OF THE DRAWINGS

A full and enabling disclosure is set forth more particularly in the remainder of the specification. The specification refers to the following appended figures.

DETAILED DESCRIPTION

Figure 1:
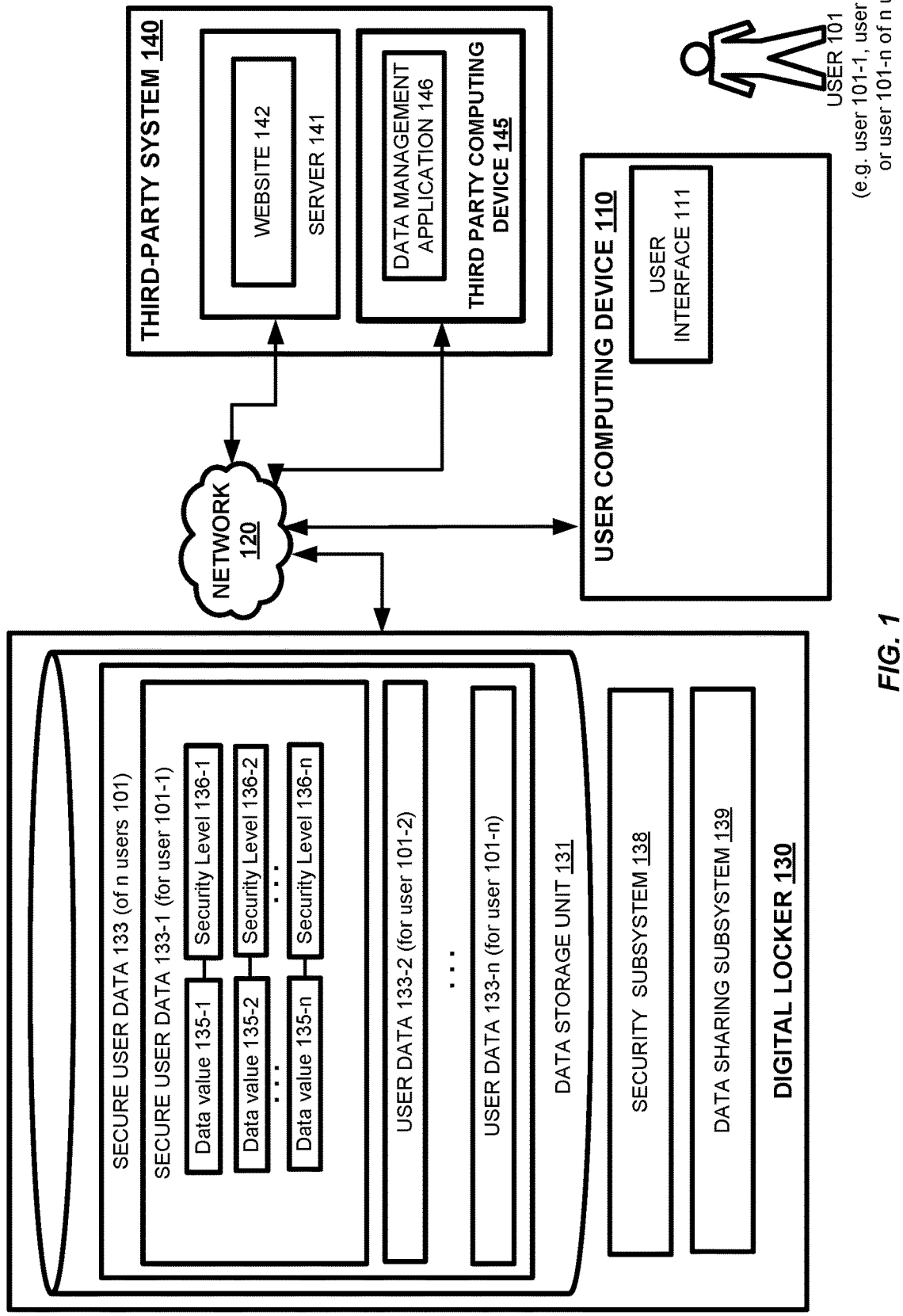
FIG. 1 shows an example system for a subscribable information locker according to one embodiment of the present disclosure.

Reference will now be made in detail to various and alternative illustrative examples and to the accompanying drawings. Each example is provided by way of explanation, and not as a limitation. It will be apparent to those skilled in the art that modifications and variations can be made. For instance, features illustrated or described as part of one example may be used in another example to yield a still further example. Thus, it is intended that this disclosure include modifications and variations as come within the scope of the appended claims and their equivalents.

Illustrative Embodiment of a Subscribable Information Locker

Many different entities, such as online or brick and mortar retailers, publishers, airlines, hotels, financial institutions (e.g., banks and investment brokers), insurance companies, and other institution store data about users (e.g., an individual or organizations), referred to as "secure user information." This secure user information can include, e.g., name, addresses (e.g., home, work, and/or mailing/shipping address), telephone numbers (e.g., home, work, and/or mobile), email addresses (e.g., personal and/or business), banking information (e.g., account types, numbers, and associated financial institutions), identification numbers (e.g., social security number, driver's license number, tax identification number, student or employee ID numbers), passport information, or credit/debit card information. In some embodiments, secure user information can further include information about a user's activities, e.g., purchase history, banking history, web-browsing history, reading history, favorited items, social media history, online wish list, or some other data that may be tracked by online or brick and mortar entities.

Secure user information may periodically change, e.g., address, phone number, credit/debit card numbers, and email addresses may periodically change or be updated. Similarly, information regarding a user's activity will also change (e.g., as a user's interests and/or purchases change). The present disclosure provides a system to disseminate updated secure user information to subscribers (e.g., third parties such as online or offline retailers, financial institutions, insurance companies, governments, family members, or other entities that the user authorizes to track the secure user information). Thus, the user may update secure user information at one location, and that updated secure user information is then disseminated to approved third parties.

The present disclosure implements a digital locker platform that stores secure user information, as discussed above. Third parties can subscribe to this digital locker platform such that when secure user information is updated, that secure user information is automatically updated for subscribers. In some embodiments, a digital locker may comprise a backend server configured to host information regarding any of several entities. Users may be tracked by the information locker via self-enrollment in the service. Alternatively, users may be enrolled automatically by the provider of the digital locker or a third party (e.g., a financial institution, credit reporting agency, retailer, magazine provider or other entity), that is authorized by the user to enroll the user in the digital locker.

As described herein, the digital locker maintains secure user information about the user and supplements or updates that secure user information as new information is gathered from the user or based on monitoring interactions between the user and third parties. Third parties may subscribe to the information locker for a particular user or group of users. Upon subscription, secure user information in the information locker may be pushed to the subscribed third parties when that secure user information is updated.

In some embodiments, the user may designate the specific secure user information that is tracked, and the security levels associated with various types of secure user information. For example, a user may designate one email address with a low security level, such that it is readily shared, but designate a social security number with a high security level such that only the most trusted third parties can receive that information. Similarly, in some embodiments, the user may designate third parties with an authorization level that indicates what security level of secure user information the third party can access. For example, in some embodiments, the user may authorize an online retailer to receive updates to the user's mailing address but may restrict access to the user's social security number to only more trusted third parties such as governments and financial institutions.

Thus, as disclosed herein, when an individual user changes his/her home address, rather than update dozens or hundreds of organizations regarding the change, the individual can simply provide an update to his/her information locker, which may disseminate the information appropriately in an automated fashion. Furthermore, the information locker may confirm the veracity of the secure user data based on other customer interactions with subscribed third parties.

Example Systems for a Subscribable Information Locker

Referring now to the drawings, FIG. 1 depicts an example of a computing environment 100 for a subscribable information locker according to certain embodiments disclosed herein.

As shown in FIG. 1, the computing environment 100 includes a digital locker 130 that can communicate via a network 120 with one or more third party systems 140 and one or more user computing devices 110. In some embodiments, the third-party system includes a server 141 (which supports a website 142) and/or a third-party computing device 145 (e.g., a point of service device or mobile device at a store location).

In certain embodiments, the user computing device 110 includes a user interface 111, which may execute other applications including web-browsing, email, and other applications. The user interface 111 enables a user to interact with the user computing device 110. The user, in some instances, has an account with the Digital Locker 130 and is a customer of one or more third party systems 140 with which the user can use the digital locker 130 to share secure user information.

The user interface 111 may be a touch screen interface, a voice-based interface, or any other interface that allows users to provide input and receive output from one or more applications on the user computing device 110. In an example, the user 101 interacts via the user interface 111 with the digital locker to establish a new account or to access an existing account with the digital locker 130. Further, using the user interface 111, the user can access a website 142 (e.g., a shopping website) of a third-party system 140 and/or can use a standalone-third party application to access the website 142.

The user 101 can upload secure user data 133 to the digital locker 130 using the user interface 111. Further, the user 101 can set a security level associated with secure user data. For example, the user may set a more restrictive security level associated with the user's social security number than that associated with the user's address. Similarly, the user 10 can set an authentication level associated with various third-party subscribers, e.g., the user 101 may allow trusted institutions, such as financial institutions, to access more data or more secure user data than an online retailer.

The digital locker 130 can communicate with one or more user computing devices 110 and one or more third party systems 140 via the network 120. In certain embodiments, the digital locker 130 includes a data storage unit 131, security subsystem 138, and a data sharing subsystem 139.

The data storage unit 131 may comprise a local or remote storage device or other memory suitable for storing information and accessible to the digital locker 130. The digital locker 130 can store, in the data storage unit 131, secure user data 133 of a set of n users 101 having accounts with the digital locker 130. For each of the users 101 (e.g., users 101-1, 101-2, . . . 101-n), the digital locker 130 can store, in the data storage unit 131, respective user data 133 (e.g., user data 133-1, 133-2, . . . 133-n) and a set of n security levels for each type of user data 135-n for each user. In some embodiments, the security levels for each data value are set by the user associated with the user. Further, in some embodiments the user can also set an authorization value for each third-party subscriber that wants to access the secure user data associated with that user.

In certain embodiments, the security subsystem receives the security level associated with each data value of the secure user data associated with the user. The security subsystem compares a security level associated with secure user data to an authentication level associated with a third-party subscriber to the user data. Based on this comparison, the security subsystem 138 determines whether a third-party subscriber can receive updates to certain of the secure user data of the user. For example, a user may set a very high security level associated with the user's social security number or financial information and thus this information may be received by only trusted third-party subscribers such as financial institutions.

In certain embodiments, the data sharing subsystem 139 receives a request for user data 133 from a third-party system 140. In certain embodiments the data sharing subsystem 139 receives the request from a server 141 the third-party system 140. In certain embodiments, the data sharing subsystem 139 receives the request from a third-party computing device 145 (e.g., a mobile device) of the third-party system 140. The data sharing subsystem 139 relies upon the determination of the security subsystem to determine whether particular secure user data of the user may be shared with a particular third-party system of a third-party subscriber.

In some instances, the request, includes a third-party system 140 identifier or a type indicator (e.g., hospital, government, merchant, advertiser, etc.) that identifies a type of third-party system 140. The data sharing subsystem 139 can select specific secure user's data based on the request from the third-party system 140.

The data sharing subsystem 139 transmits to the requesting third party system 140, a subset of user data 133-1 in accordance with the determination of the security subsystem 138. In some embodiments, before transmitting any user data 133-1 to the requesting third party system 140, the data sharing system 139 displays, via the user computing device 110, a request to authorize sharing of data with the requesting third party system 140 in accordance with the security levels authorized by the user for the secure user data and receives an approval of the request to authorize sharing.

The digital locker 130 (including the security subsystem 138 and the data sharing subsystem 139) may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the digital locker 130 can be implemented using more or fewer systems or subsystems than those shown in FIG. 1, may combine two or more subsystems, or may have a different configuration or arrangement of the systems or subsystems.

In certain embodiments, the third-party computing system 140 includes a server 141, which supports a website 142. In certain embodiments, the third-party computing system 140 includes a third-party computing device 145 in addition to, or instead of, the server 141 and website 142. In certain embodiments, the third-party system 140 participates in an interaction with a user 101-1 and requests user data 133-1 for the user 101-1 from the digital locker 130. For example, the user interaction is an online purchase or other online interaction conducted by the user 101-1 with the website 142 using the user computing device 110. In another example, the user interaction is an in-person interaction at the third-party computing device 145. For example, the third-party computing device 145 could be a point-of-sale device, a mobile device, or other device at a location of the third-party computing system 140.

The third-party system 140 can include a user identifier to identify the user, for example, an identifier of a digital locker 130 account. In some instances, the third-party system 140 can receive user computing device 110 data to include in the request for user data 133-1, which can include a user computing device 110 identifier. In some embodiments, the third-party system 140 includes, in the request for the user data 133-1, a type identifier (e.g., hospital, government, merchant, advertiser, etc.) that identifies a type associated with the third-party system 140. In some embodiments, the third-party system 140 includes, in the request for the user data 133-1, a third-party system 140 identifier identifying itself. The third-party system 140 can receive from the digital locker 130, a subset of user data 133-1 authorized by the security subsystem of the digital locker 130.

Figure 2:
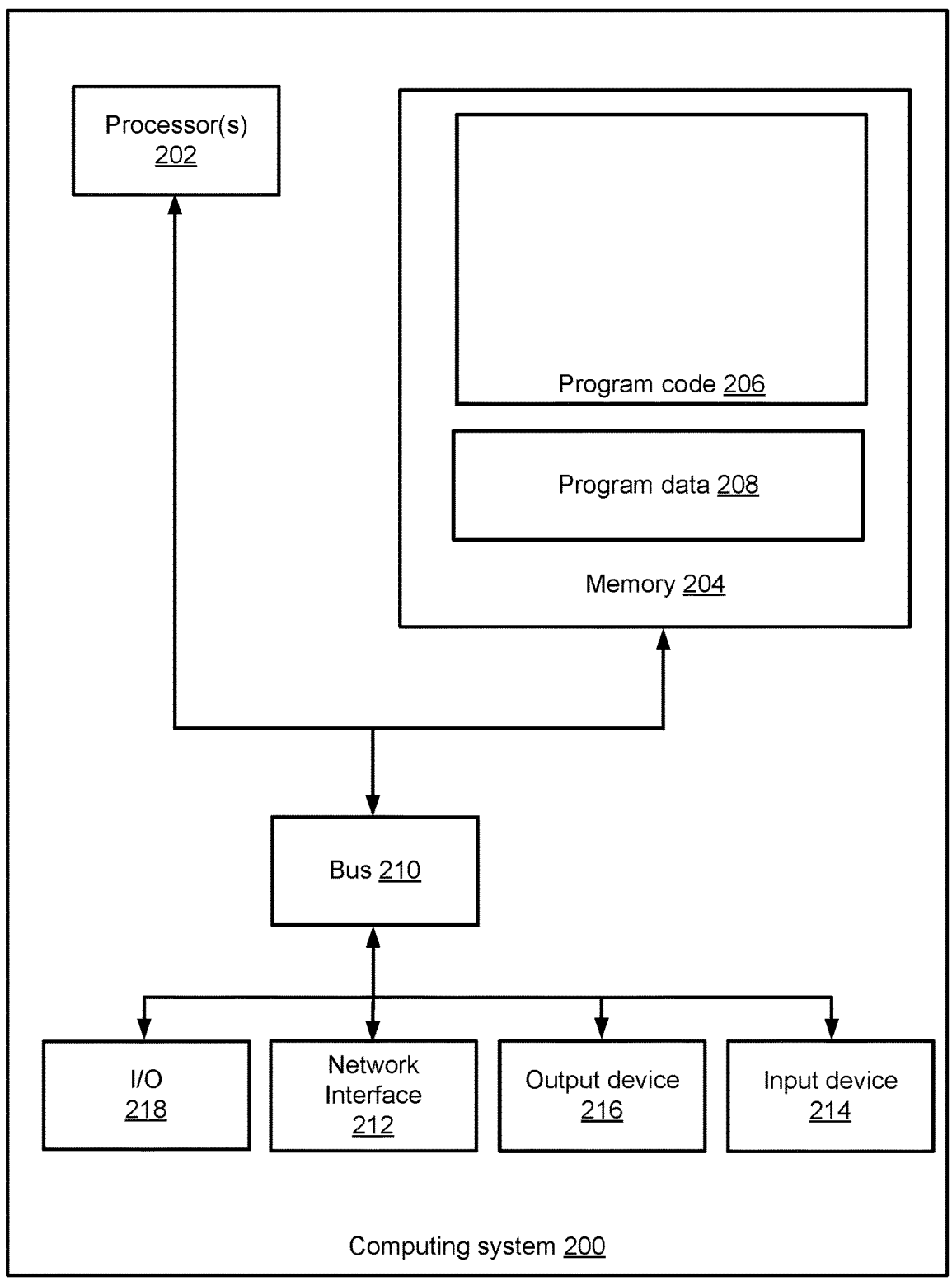
FIG. 2 shows another example system for a subscribable information locker according to another embodiment of the present disclosure.

Turning now to FIG. 2, which depicts an example of a computer system 200 for implementing a subscribable information locker. The depicted example of the computer system 200 includes a processor 202 communicatively coupled to one or more memory devices 204. The processor 202 executes computer-executable program code stored in a memory device 204, accesses information stored in the memory device 204, or both. Examples of the processor 202 include a microprocessor, an application-specific integrated circuit ("ASIC"), a field-programmable gate array ("FPGA"), or any other suitable processing device. The processor 202 can include any number of processing devices, including a single processing device.

The memory device 204 includes any suitable non-transitory computer-readable medium for storing program code 206, program data 208, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the memory device 1104 can be volatile memory, non-volatile memory, or a combination thereof.

The computer system 200 executes program code 206 that configures the processor 202 to perform one or more of the operations described herein. The program code 206 may be resident in the memory device 204 or any suitable computer-readable medium and may be executed by the processor 202 or any other suitable processor.

The processor 202 is an integrated circuit device that can execute the program code 206. The program code 206 can be for executing an operating system, an application system or subsystem, or both. When executed by the processor 202, the instructions cause the processor 202 to perform operations of the program code 206. When being executed by the processor 202, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 204 store the program data 208 that includes one or more datasets described herein. In some embodiments, one or more of data sets are stored in the same memory device (e.g., one of the memory devices 204). In additional or alternative embodiments, one or more of the programs, data sets, models, and functions described herein are stored in different memory devices 204 accessible via a data network. One or more buses 210 are also included in the computer system 200. The buses 210 communicatively couple one or more components of a respective one of the computer system 200.

In some embodiments, the computer system 200 also includes a network interface device 212. The network interface device 212 includes any device or group of devices suitable for establishing a wired or wireless data connection to one or more data networks. Non-limiting examples of the network interface device 212 include an Ethernet network adapter, a modem, Wi-Fi adapter, Bluetooth adapter, NFC receiver and transmitter, or any other known wired or wireless data transmission system. The computer system 200 can communicate with one or more other computing devices via a data network using the network interface device 212.

The computer system 200 may also include several external or internal devices, an input device 214, a presentation device 216, or other input or output devices. For example, the computer system 200 is shown with one or more input/output ("I/O") interfaces 218. An I/O interface 218 can receive input from input devices or provide output to output devices. An input device 214 can include any device or group of devices suitable for receiving visual, auditory, or other suitable input that controls or affects the operations of the processor 202. Non-limiting examples of the input device 214 include a touchscreen, a mouse, a keyboard, a microphone, a separate mobile computing device, etc. A presentation device 216 can include any device or group of devices suitable for providing visual, auditory, or other suitable sensory output. Non-limiting examples of the presentation device 216 include a touchscreen, a monitor, a speaker, a separate mobile computing device, etc.

Example Methods for a Subscribable Information Locker

Figure 3:
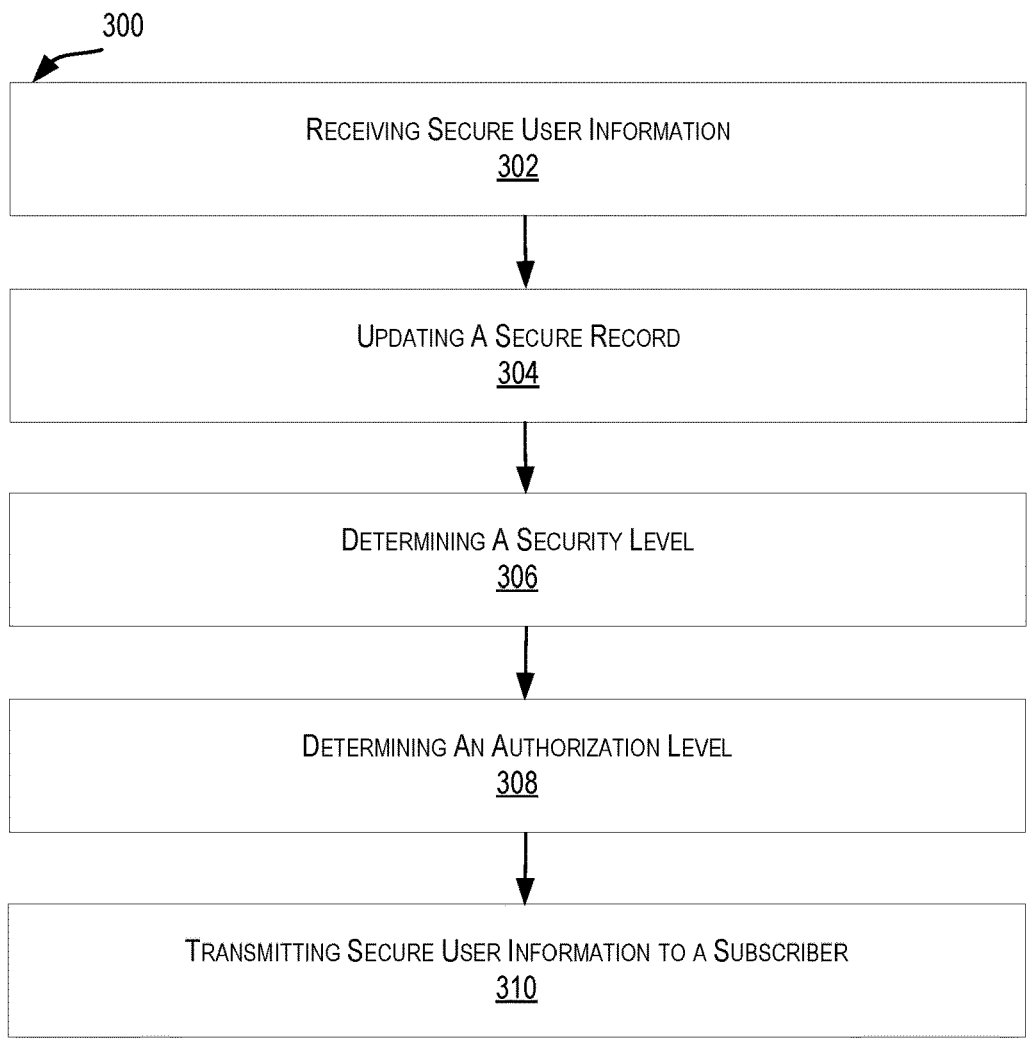
FIG. 3 illustrates a flow chart for a method a subscribable information locker according to another embodiment of the present disclosure.

FIG. 3 is a flowchart showing an illustrative method 300 for a subscribable information locker according to one embodiment of the present disclosure. In some embodiments, some of the steps in flow charts of FIG. 3 are implemented in program code executed by a processor, for example, the processor in a general-purpose computer, mobile device, or server. In some examples, these steps are implemented by a group of processors. In some examples the steps shown in FIG. 3 are performed in a different order or one or more steps may be skipped. Alternatively, in some examples, additional steps not shown in FIG. 3 may be performed.

As shown in FIG. 3, the method 300 begins at step 302 when processor 202 receives secure user information. As discussed above, the secure user information can include, e.g., name, addresses (e.g., home, work, and/or mailing/shipping address), telephone numbers (e.g., home, work, and/or mobile), email addresses (e.g., personal and/or business), banking information (e.g., account types, numbers, and associated financial institutions), identification numbers (e.g., social security number, driver's license number, tax identification number, student or employee ID numbers), passport information, or credit/debit card information. In some embodiments, secure user information can further include information about a user's activities, e.g., purchase history, banking history, web-browsing history, reading history, favorited items, social media history, online wish list, or some other data that may be tracked by online or brick and mortar entities.

In some embodiments, processor 202 receives the secure user information from a user computing device 110 associated with the user, e.g., the user may directly update their secure user information. In other embodiments, the secure user information may be updated based on transactions between a user and a third-party system 140. For example, when the user engages in an interaction with a third-party subscriber (e.g., a purchase with an online retailer or a financial transaction with a bank or other financial institution) the third party may transmit updated secure user data to the digital locker 130. Further, in some embodiments, the digital locker 130 may authenticate the stored secure user data based on the user's transactions with subscribing third party systems. For example, if the user changes a shipping address, email address, or other information with a third-party subscriber, then the digital locker 130 may determine that the current information is out of data or inauthentic and requires an update.

The method continues at step 304 when processor 202 updates a secure record. In some embodiments, the processor updates a data value stored on data storage unit 131. The processor may further update the security level associated with the secure user data as well as an authorization level associated with third party subscribers that may access the user data.

Next, at step 306 processor 202 determines a security level. The secure user data associated with a user may comprise a security level to indicate the level of security associated with the data. The processor 202 may determine the security level associated with secure user data in response to a request by a third-party subscriber for updated secure user data, or in response to the user updating the secure user data.

The method continues at step 308 when processor 202 determines an authorization level 308. The authorization level may be set by the user and determines the level of authorization of a third-party subscriber. For example, certain third-party subscribers may have a higher authorization level and thus be able to access secure user data with a higher security level. For example, a user may set a high security level to data such as the user's social security number, and this high security level data may be shared with only third-party subscribers to which the user has assigned a high authorization level.

Next at step 310 the processor 202 transmits secure user information to a subscriber 310. In some embodiments, the processor transmits only secure user data that has a security level that matches the authentication level of the third-party subscriber. In some embodiments, the secure user data may comprise an expiration such that it must be updated within a set period, or it expires and thus the third-party subscriber can no longer access the secure user data.

General Considerations

Although the subject matter has been described in language specific to structural features or methodological acts, it is to be understood that the subject matter of the appended claims is not necessarily limited to the specific features or acts described above. Rather, the specific features and acts described above are disclosed as examples.

Various operations of examples are provided herein. The order in which one or more or all of the operations are described should not be construed as to imply that these operations are necessarily order dependent. Alternative ordering will be appreciated based on this description. Further, not all operations may necessarily be present in each example provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has," "with," or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, or an ordering. Rather, such terms are merely used as identifiers, names, for features, elements, or items. For example, a first state and a second state generally correspond to state 1 and state 2 or two different or two identical states or the same state. Additionally, "comprising," "comprises," "including," "includes," or the like generally means comprising or including.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random-access memory (RAM) coupled to the processor. The processor executes computer-executable program instructions stored in memory, such as executing one or more computer programs including a sensor sampling routine, a haptic effect selection routine, and suitable programming to produce signals to generate the selected haptic effects as noted above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, which may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method comprising:
   receiving, from a user, first secure user information associated with the user;
   updating a secure record associated with the user to include the first secure user information;
   receiving, from the user, a designation of one or more subscribers, wherein each subscriber comprises a third-party separate from the user, wherein the third-party comprises a credit-reporting agency, and wherein each subscriber is associated with a subscription to automatically receive periodic updates to the first secure user information;
   receiving, from the user, a security level associated with the first secure user information and a user defined authorization level associated with each subscriber;
   evaluating, for each subscriber and upon updating the secure record, whether the user defined authorization level associated with each subscriber meets the security level of the first secure user information; and
   responsive to the user defined authorization level associated with each subscriber meeting the security level of the first secure user information, transmitting data associated with the first secure user information to a respective subscriber without the respective subscriber requesting the first secure user information.

2. The method of claim 1, wherein the secure record comprises a plurality of user information, and wherein the method further comprises:
   comparing the first secure user information to each user information of the plurality of user information to determine a similarity between the first secure user information and a respective user information of the plurality of user information; and
   upon determining the similarity, updating the secure record to replace the respective user information with the first secure user information.

3. The method of claim 1, further comprising:
   receiving second secure user information associated with the user, wherein the second secure user information is received from a business unit associated with a host of the secure record; and
   upon determining the respective subscriber is authorized to receive the second secure user information, transmitting data associated with the second secure user information to the respective subscriber without the respective subscriber requesting the second secure user information.

4. The method of claim 1, further comprising:
   receiving third secure user information associated with the user, wherein the third secure user information is received from a third-party source; and
   upon determining the respective subscriber is authorized to receive the third secure user information, transmitting data associated with the third secure user information to the respective subscriber without the respective subscriber requesting the third secure user information.

5. The method of claim 4, wherein the third-party source comprises a government entity.

6. The method of claim 1, wherein different user information comprises a different security level.

7. The method of claim 1, wherein the first secure user information comprises a predefined expiration period, wherein access to the first secure user information by the respective subscriber is terminated after expiration of the predefined expiration period.

8. The method of claim 1, wherein updating the secure record associated with the user to include the first secure user information comprises creating a new secure record associated with the user.

9. A system comprising:
   a processor configured to:
   receive, from a user, first secure user information associated with the user;
   update a secure record associated with the user to include the first secure user information;
   receive, from the user, a designation of one or more subscribers, wherein each subscriber comprises a third-party separate from the user, wherein the third-party comprises a credit-reporting agency, and wherein each subscriber is associated with a subscription to automatically receive periodic updates to the first secure user information;

receive, from the user, a security level associated with the first secure user information and a user defined authorization level associated with each subscriber;

evaluate, for each subscriber and upon updating the secure record, whether the user defined authorization level associated with each subscriber meets the security level of the first secure user information; and responsive to the user defined authorization level associated with each subscriber meeting the security level of the first secure user information, transmit data associated with the first secure user information to a respective subscriber without the respective subscriber requesting the first secure user information.

10. The system of claim 9, wherein the secure record comprises a plurality of user information, and wherein the processor is further configured to:

compare the first secure user information to each user information of the plurality of user information to determine a similarity between the first secure user information and a respective user information of the plurality of user information; and upon determining the similarity, updating the secure record to replace the respective user information with the first secure user information.

11. The system of claim 9, wherein the processor is further configured to:

receive second secure user information associated with the user, wherein the second secure user information is received from a business unit associated with a host of the secure record; and upon determining the respective subscriber is authorized to receive the second secure user information, transmit data associated with the second secure user information to the respective subscriber without the respective subscriber requesting the second secure user information.

12. The system of claim 9, wherein the processor is further configured to:

receive third secure user information associated with the user, wherein the third secure user information is received from a third-party source; and upon determining the respective subscriber is authorized to receive the third secure user information, transmit data associated with the third secure user information to the respective subscriber without the respective subscriber requesting the third secure user information.

13. The system of claim 12, wherein the third-party source comprises a government entity.

14. The system of claim 9, wherein different user information comprises a different security level.

15. The system of claim 9, wherein the first secure user information comprises a predefined expiration period, wherein access to the first secure user information by the respective subscriber is terminated after expiration of the predefined expiration period.

16. A non-transitory computer readable medium comprising instructions that when executed by one or more processors cause the one or more processors to:

receive, from a user, first secure user information associated with the user;

update a secure record associated with the user to include the first secure user information;

receive, from the user, a designation of one or more subscribers, wherein each subscriber comprises a third-party separate from the user, wherein the third-party comprises a credit-reporting agency, and wherein each subscriber is associated with a subscription to automatically receive periodic updates to the first secure user information;

receive, from the user, a security level associated with the first secure user information and a user defined authorization level associated with each subscriber;

evaluate, for each subscriber and upon updating the secure record, whether the user defined authorization level associated with each subscriber meets the security level of the first secure user information; and responsive to the user defined authorization level associated with each subscriber meeting the security level of the first secure user information, transmit data associated with the first secure user information to a respective subscriber without the respective subscriber requesting the first secure user information.

* * * * *